(12) United States Patent
Holzapfel et al.

(10) Patent No.: US 9,389,065 B2
(45) Date of Patent: Jul. 12, 2016

(54) POSITION-MEASURING DEVICE AND SYSTEM HAVING SUCH A POSITION-MEASURING DEVICE

(71) Applicant: DR. JOHANNES HEIDENHAIN GMBH, Traunreut (DE)

(72) Inventors: Wolfgang Holzapfel, Obing (DE); Joerg Drescher, Samerberg (DE); Markus Meissner, Uebersee (DE); Ralph Joerger, Traunstein (DE); Bernhard Musch, Otterfing (DE); Thomas Kaelberer, Schrobenhausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 429 days.

(21) Appl. No.: 13/845,988

(22) Filed: Mar. 18, 2013

(65) Prior Publication Data

US 2013/0235390 A1  Sep. 12, 2013

Related U.S. Application Data

(60) Provisional application No. 61/614,105, filed on Mar. 22, 2012.

(30) Foreign Application Priority Data

Mar. 22, 2012 (DE) .......................... 10 2012 204 572

(51) Int. Cl.
  *G01B 11/14* (2006.01)
  *G01B 11/26* (2006.01)
  *G01D 5/347* (2006.01)

(52) U.S. Cl.
  CPC .............. *G01B 11/14* (2013.01); *G01B 11/26* (2013.01); *G01D 5/34746* (2013.01); *G01D 5/34715* (2013.01)

(58) Field of Classification Search
  CPC ........................... G01D 5/268; G01D 5/34792
  USPC ...................................... 356/607–614
  See application file for complete search history.

(56) References Cited

U.S. PATENT DOCUMENTS 7,714,273 B2  5/2010  Saendig
7,804,579 B2  9/2010  Loopstra et al.
(Continued)

FOREIGN PATENT DOCUMENTS

DE  10 2012 201 393  8/2013
EP  1 923 672  5/2008
EP  2 006 740  12/2008

OTHER PUBLICATIONS

U.S. Appl. No. 13/757,533, filed Feb. 1, 2013.
(Continued)

*Primary Examiner* — Kara E Geisel
*Assistant Examiner* — Iyabo S Alli
(74) *Attorney, Agent, or Firm* — Kenyon & Kenyon LLP (57) ABSTRACT

A position-measuring device, as well as a system having such a position-measuring device, is used for determining the position of a first object relative to a second object, the first and the second object being movable relative to one another along at least two measuring directions. The position-measuring device has an optical unit that is linked to one of the two objects and includes at least one light source, a detector system, as well as further optical elements in a defined configuration. In addition, the position-measuring device includes a measuring standard-reflector unit, which is provided on the other object, and has at least two differently formed regions in one track that are optically scannable by the optical unit for position sensing. The different formation of the regions makes switching among the various measuring directions possible during position sensing, and positional signals can be generated by the optical unit relative to the relative movement of the two objects for each measuring direction.

16 Claims, 3 Drawing Sheets

(56) References Cited

U.S. PATENT DOCUMENTS

| | | | |
|---|---|---|---|
| 7,858,922 B2* | 12/2010 | Holzapfel | G01D 5/2457 356/616 |
| 8,174,671 B2* | 5/2012 | Loopstra et al. | 356/400 |
| 8,578,619 B2* | 11/2013 | Nakajima | G01B 5/008 33/556 |
| 2008/0098813 A1 | 5/2008 | Sekiguchi | |
| 2011/0255096 A1 | 10/2011 | Deck et al. | |

OTHER PUBLICATIONS

U.S. Appl. No. 61/593,582, filed Feb. 1, 2012.
C. Elster, "Exact wave-front reconstruction from two lateral shearing interferograms," J. Opt. Sco. Am. 16(9): 2281-2285 (1999).
European Search Report, dated Mar. 9, 2015, issued in corresponding European Patent Application No. 13157956.7.

* cited by examiner

POSITION-MEASURING DEVICE AND SYSTEM HAVING SUCH A POSITION-MEASURING DEVICE

CROSS-REFERENCE TO RELATED APPLICATIONS

The present application claims priority to Application No. 10 2012 204 572.4, filed in the Federal Republic of Germany on Mar. 22, 2012, and claims the benefit of U.S. Provisional Patent Application Ser. No. 61/614,105, filed on Mar. 22, 2012, each of which is expressly incorporated herein in its entirety by reference thereto.

FIELD OF THE INVENTION

The present invention relates to a position-measuring device and to a system having such a position-measuring device.

BACKGROUND INFORMATION

Machines used for manufacturing and testing semiconductor components often require that objects be precisely positioned therein. Thus, the need can arise, for instance, for highly accurate positioning of wafers underneath a tool of an exposure or inspection unit. The wafer resides on a stage that is movable in six degrees of freedom and that is moved by a corresponding drive. Accordingly, the stage functions as an object whose position is to be measured with a high degree of accuracy. Positioning this stage over the drive and a corresponding control unit requires highly accurate position-measuring devices to generate positional signals indicative of the spatial position of the stage.

In such machines, interferometers or grating-based optical position-measuring devices are used as highly accurate position-measuring devices. German Patent Application No. 10 2012 201 393.3, U.S. patent application Ser. No. 13/757,533, and U.S. Provisional Application Ser. No. 61/593,582, each of which is expressly incorporated herein in its entirety by reference thereto, describe a measuring system for such a use that combines different position-measuring devices. Thus, a multi-axis interferometer is used for measuring positions along a first, long principal axis of motion of the object and for recording rotational movements about other axes. Provided on the object in this case is a measuring reflector, to which measurement beams of the multi-axis interferometer are incident. Interferential position-measuring devices are provided for measuring positions along a second principal axis of motion and along a third axis. They include, for example, measuring standards provided on the object in the form of incident-light diffraction gratings, as well as reflectors that are fixed relative thereto. Other diffraction gratings are provided on the reflectors, it being possible for the reflectors to be arranged as transmitted-light grating-mirror units, for example. During assembly and use, the measuring reflectors, measuring standards, and reflectors used in the various position-measuring devices are subject to mechanical, as well as thermal stresses and may also undergo slow deformation in the process. Such deformations of these elements result in measurement errors when determining positions.

To compensate for these measurement errors, what are generally referred to as self-calibration methods are used, for example, for measuring and correcting the active deformations of the particular elements, such as, for example, the measuring standards, respectively reflectors, during operation or during special calibration cycles of the particular machine. These types of self-calibration methods generally require the measuring standard or the reflector to be scanned along the particular extension direction by two or more scanning, e.g., optical, units, and the positional signals to be generated by both optical units. The positional signals of the two optical units are then differentially transmitted, so that, from the resulting differential signal, the specific existing, deformation-induced error of the particular measuring standard or reflector can be calculated and subsequently compensated for, e.g., in a conventional manner. With regard to such self-calibration methods, reference is made, for example, to the publication, "Exact Wavefront Reconstruction from Two Lateral Shearing Interferograms," C. Elster, I. Weingärtner in Vol. 16, No. 9, September 1999, J. Opt. Soc. Am. A, 2281-2285, which is expressly incorporated herein in its entirety by reference thereto.

This means that, per measuring direction, such a self-calibration method requires two optical units for scanning and positional signal generation. This constitutes substantial additional expenditures and, consequently, an increase in the unit volume of the entire system.

Regardless of the described self-calibration problems, it may also be necessary or advantageous for other reasons to redundantly measure positions along one direction of movement in certain measuring sequences or machine states. Thus, for example, at certain positions, the requisite number of what are generally referred to as Abbe arms may be reduced or the accuracy enhanced.

SUMMARY

Example embodiments of the present invention provide a method for highly accurate position sensing of a movable object, that will allow the position of the object to be measured along different measuring directions at low cost and with little complexity.

According to example embodiments of the present invention, the position-measuring device may be used to determine the position of a first object relative to a second object, the first and the second object being movably configured relative to one another along at least two measuring directions. The position-measuring device includes an optical unit that is linked to one of the two objects and includes at least one light source, a detector system, as well as further optical elements in a defined configuration. In addition, a measuring standard-reflector unit is provided that is arranged on the other object. It includes at least two differently formed regions in one track that may be optically scanned by the optical unit for position sensing, the differently formed regions making it possible to switch among the various measuring directions during position sensing, and positional signals being able to be generated by the optical unit relative to the relative movement of the two objects for each measuring direction.

The measuring reflectors and measuring standards may be provided in the various regions of the track of the measuring standard-reflector unit.

In this case, the measuring reflectors may be in the form of plane mirrors, and the measuring standards may be arranged as incident-light diffraction gratings.

Ray bundles that strike the differently formed regions may be subject to different deflection effects.

The measuring standard-reflector unit may include a plurality of parallel configured tracks within which measuring standards and/or measuring reflectors are arranged.

For this purpose, it is possible that a measuring standard is provided within one track, a measuring reflector is provided within a further track in a first region, and a measuring standard is provided in a second region that is identical in configuration to the measuring standard in the other track.

It may be provided for a central first region to be arranged in the track along the extension direction of the track, and for a differently formed second region to be arranged in the track at least at one end of the first region.

A first region extending over the greater part of the track may also be provided therein, and a second, differently formed region extending merely over a significantly smaller region of the track may be provided therein.

Certain configurations may include a position-measuring device; a first object that is movable along two orthogonal, first and second principal axes of motion, as well as along a third axis, the first principal axis of motion corresponding to a first measuring direction, the third axis corresponding to a second measuring direction, and the second principal axis of motion corresponding to a third measuring direction; and a second object that is fixedly mounted relative to the first object, the optical unit being provided on the second object.

In this case, the measuring standard-reflector unit extending along the second principal axis of motion is provided on the first object and includes a track having a first region including a measuring reflector and a second region having a measuring standard, so that, upon optical scanning of the first region, positional signals indicative of a movement of the first object may be generated along the first measuring direction, and, upon optical scanning of the second region, positional signals indicative of a movement of the first object may be generated along the second measuring direction or along the third measuring direction.

The system may include a second position-measuring device that may be used to generate positional signals indicative of a movement of the first object along the second measuring direction.

In addition, the system may include a third position-measuring device that may be used to generate positional signals indicative of a movement of the first object along the third measuring direction.

Thus, when the measuring standard is optically scanned in the second region, and the positional signals are simultaneously generated by the second or third position-measuring device during a traverse movement along the first measuring direction, a reflector of the second or third position-measuring device may be scanned twice in each case along the first measuring direction.

In this case, it may be provided that: the positional signals of the first and second position-measuring device are transmissible to a calibration unit; and/or the positional signals of the first and third position-measuring device are transmissible to a calibration unit. The first position-measuring device may be arranged as a multi-axis interferometer having four measurement beams.

Accordingly, the measuring direction, along which a position sensing is performed by the position-measuring device, is no longer determined by the scanning unit or the optical unit used and the scanning optics provided therein, rather exclusively by the configuration of certain regions on the part of the measuring standard-reflector unit used. Thus, as a function of the relative position of the objects that are movable relative to one another or specific machine positions, it is thereby possible to selectively switch among different measuring directions, along which positional information is required, and to generate additional positional signals indicative of the object's movement along the particular new measuring direction. To generate positional signals, the same optical unit or scanning optics may be used in each case for the various measuring directions. The requisite expenditure for the total system may thereby be considerably reduced, and the installation volume may be decreased.

Besides the particular application to be explained in more detail below, in certain systems, which require a self-calibration of specific components, it should be appreciated that example embodiments of the present invention may also be used in conjunction with other measuring systems where this type of switchover option among various measuring directions is considered necessary or advantageous.

Further features and aspects of example embodiments of the present invention are described in more detail below with reference to the appended Figures.

DETAILED DESCRIPTION

Figure 1A:
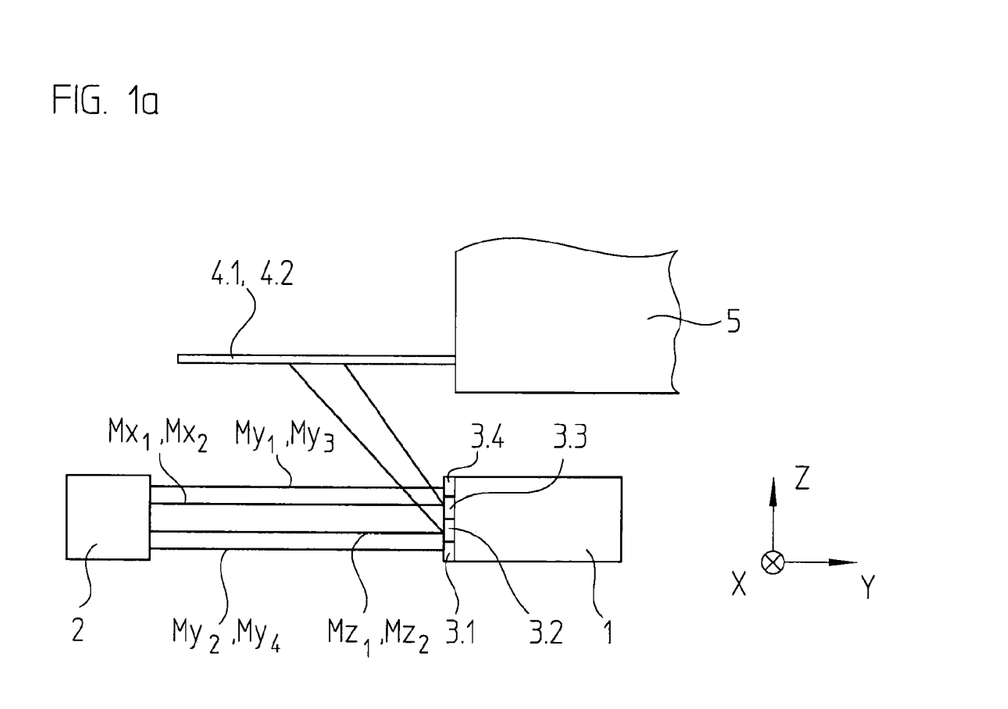
FIG. 1a schematically illustrates a system including a position-measuring device according to an example embodiment of the present invention in a first view, in the z-y plane.
Figure 1B:
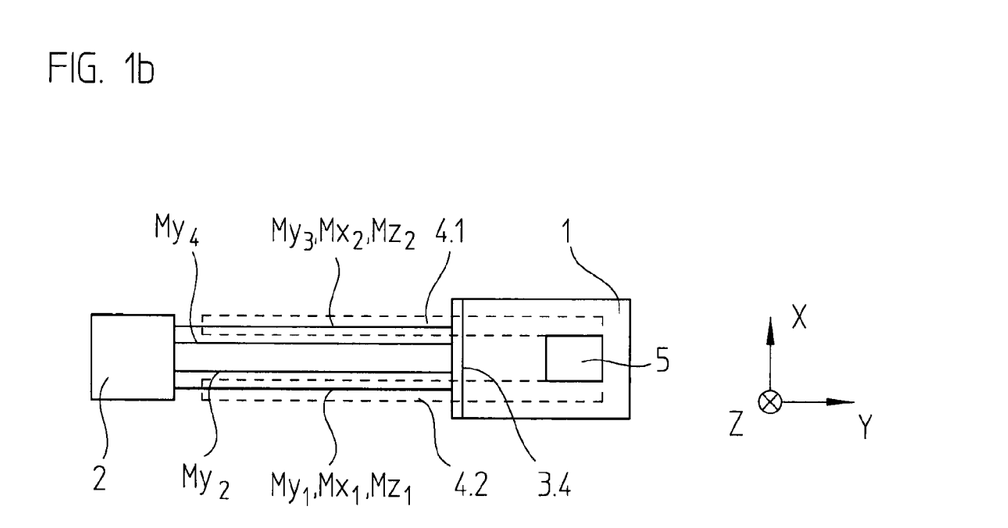
FIG. 1b schematically illustrates the system illustrated in FIG. 1a in a second view, in the x-y plane.

A system for capturing the position of a first object 1 in six degrees of freedom is schematically illustrated in FIGS. 1a and 1b. In this case, first object 1, for example, a stage in a machine for fabricating or inspecting semiconductors, is arranged along a first and second principal axis of motion y, x, as well as along a third axis z that is perpendicular thereto, movably relative to a second object 5, for example, a fixed machine part. In the following, first principal axis of motion y is also referred to as a first measuring direction, third axis z as a second measuring direction, and second principal axis of motion x as a third measuring direction.

Besides measuring the linear movement of the object along second principal axes of motion x, y and along third axis z, rotational movements of object 1 about three different axes x, y, z should also be measured to permit highly accurate positioning of object 1, in order to determine the position of object 1 in space in all six degrees of freedom. The rotational movements of object 1 about axes x, y, z are denoted in the following as Rx, Ry and Rz movements.

To capture all six degrees of freedom of movable first object 1, a plurality of position-measuring devices are used that are suitably combined into a total overall system, as described, for example, in German Patent Application No. 10 2012 201 393.3, U.S. patent application Ser. No. 13/757,533, and U.S. Provisional Application Ser. No. 61/593,582, each of which is expressly incorporated herein in its entirety by reference thereto. On the one hand, the position-measuring devices include an optical unit 2, as well as reflectors 4.1, 4.2, which, in the present example, are connected or coupled to second object 5, i.e., to the fixed machine part. In optical unit 2, a light source, a detector system, as well as further optical elements are provided in a defined configuration. Alternatively to the direct configuration of the light source and/or detector system in optical unit 2, it may also be provided for these components to be connected via fiber-optic conductors to optical unit 2. Belonging, on the other hand, to the position-measuring devices is a basic unit referred to in the following as measuring standard-reflector unit 3, which is arranged on object 1 and, accordingly, is movable along various axes x, y, z relative to the other components of the position-measuring devices. As illustrated in FIG. 1d, measuring standard-reflector unit 3 includes a plurality of tracks 3.1 to 3.4 that are arranged parallel to one another along second principal axis of motion x. Arranged in tracks 3.1 to 3.4 in the illustrated exemplary embodiment are measuring standards and/or measuring reflectors upon which measurement beams $Mx_1$, $Mx_2$, $My_1$, $My_2$, $My_3$, $My_4$, $Mz_1$, $Mz_2$ of the various position-measuring devices strike. As measuring reflectors, plane mirrors may be provided, for example, and as a measuring standard, one- or two-dimensional diffraction gratings (incident light, transmitted light) may be provided.

Schematically illustrated in FIGS. 1a and 1b are relevant measurement beams $Mx_1$, $Mx_2$, $My_1$, $My_2$, $My_3$, $My_4$, $Mz_1$, $Mz_2$ of the position-measuring devices used for recording or determining the position of object 1 in six degrees of freedom. For clarity, the paths of rays of the individual position-measuring devices are not shown in detail in these Figures. In particular, it is not illustrated, for example, that the different measurement beams $Mx_1$, $Mx_2$, $My_1$, $My_2$, $My_3$, $My_4$, $Mz_1$, $Mz_2$ propagate twice in the direction of object 1.

A first position-measuring device is provided for primarily measuring the position of object 1 along first principal axis of motion y, or along the first measuring direction. It is also used for recording rotational movements Rx, Rz about second principal axis of motion x and third axis z. The first position-measuring device is arranged as a multi-axis interferometer having altogether four measurement beams $My_1$, $My_2$, $My_3$, $My_4$. German Patent Application No. 10 2012 201 393.3 describes a three-axis interferometer having three measurement beams.

With regard to suitable optical position-measuring devices for recording the movement of object 1 along second measuring direction z or along third measuring direction x, reference is again made to German Patent Application No. 10 2012 201 393.3, U.S. Patent application Ser. No. 13/757,533, and U.S. Provisional Application Ser. No. 61/593,582.

Thus, a second position-measuring device is provided in the present system that may be used to generate positional signals indicative of a movement of an object along second measuring direction z. This position-measuring device basically corresponds to the position-measuring device denoted as a first position-measuring device in German Patent Application No. 10 2012 201 393.3. In contrast, instead of one single measurement beam, two measurement beams $Mz_1$, $Mz_2$ are provided in the present example.

In the illustrated system, a third position-measuring device is used to generate positional signals indicative of the movement of object 1 along third measuring direction x. This position-measuring device is configured in an analogous manner to the position-measuring device denoted as a second position-measuring device in German Patent Application No. 10 2012 201 393.3. In contrast thereto, a two-dimensional measuring standard 3.2 is provided as a measuring standard for determining positions along second principal axis of motion x that is arranged parallel to axis z on first object 1. The measurement beams of the third position-measuring device are denoted by $Mx_1$ and $Mx_2$ in the Figures.

Figure 1C:
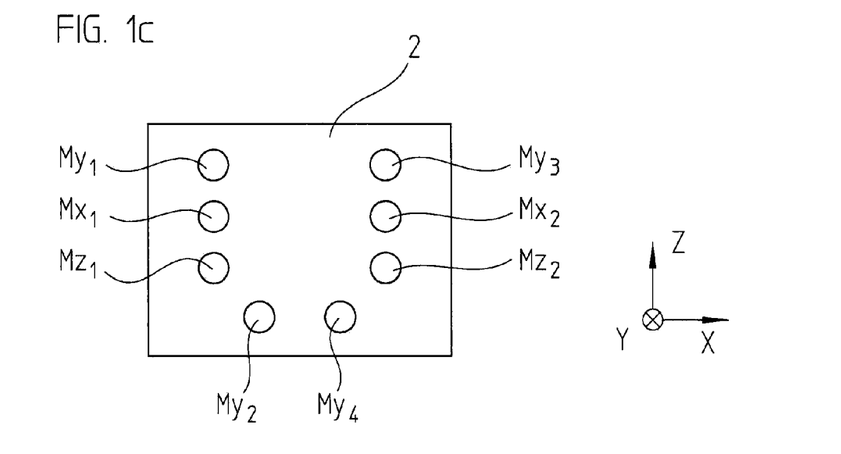
FIG. 1c is a front view of the optical unit from the system illustrated in FIGS. 1a and 1b.
Figure 1D:
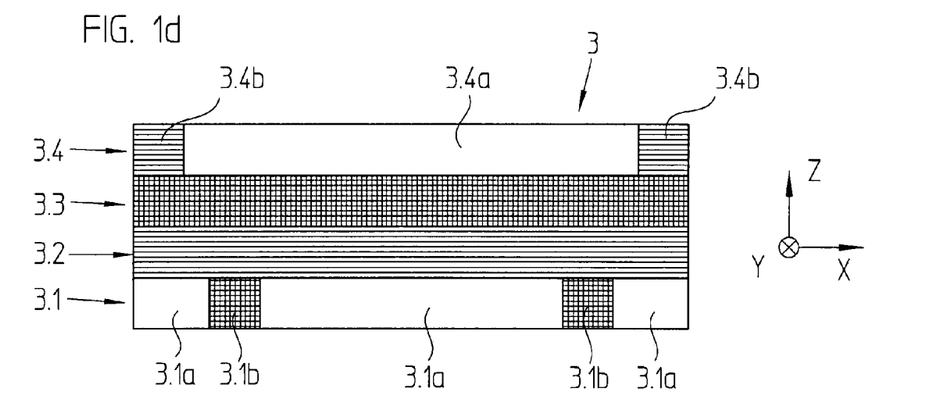
FIG. 1d is a plan view of the measuring standard-reflector unit of the system illustrated in FIGS. 1a to 1c.

With regard to the relative configuration of various measurement beams $Mx_1$, $Mx_2$, $My_1$, $My_2$, $My_3$, $My_4$, $Mz_1$, $Mz_2$ of the various position-measuring devices, reference is also made to FIG. 1c. It shows a front view of optical unit 2, including altogether eight measurement beams $Mx_1$, $Mx_2$, $My_1$, $My_2$, $My_3$, $My_4$, $Mz_1$, $Mz_2$ of the various position-measuring devices.

Figure 1E:
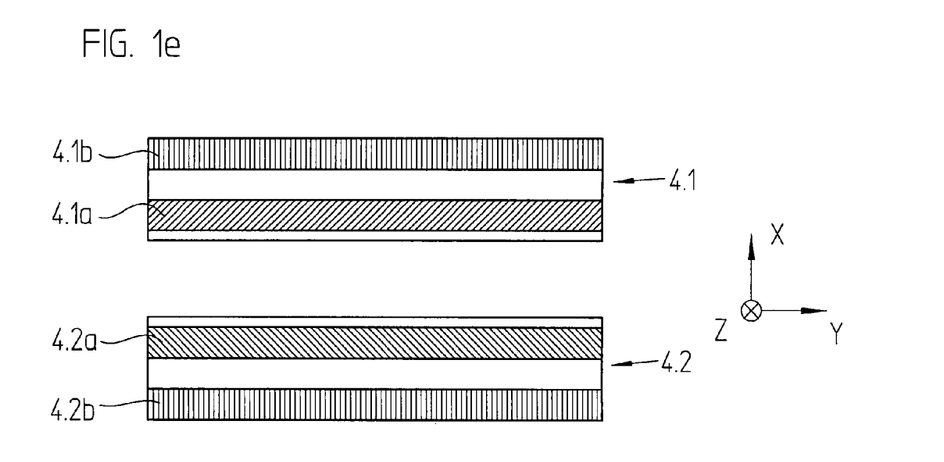
FIG. 1e is a plan view of the reflectors of the system illustrated in FIGS. 1a to 1d.

As mentioned at the outset, a highly precise positional determination using such a system requires that the measuring standards, measuring reflectors, and reflectors 4.1, 4.2 used of the position-measuring standards that are employed undergo a self-calibration. This requires that each measuring standard used, each measuring reflector, or each reflector 4.1, 4.2 in the scanning beam paths of the position-measuring devices used be scanned using two optical units or scanning units along one single scanning line, the scanning line extending in each case along the extension direction of the component to be calibrated. In this case, the requisite expenditure should basically be kept as low as possible. Thus, for example, no additional optical units should be needed. Of particular importance in the case of a configuration, as in the illustrated system, is the self-calibration of diffraction gratings 4.1a, 4.1b, 4.2a, 4.2b, which are provided on reflectors 4.1, 4.2 and are used, for example, for highly accurate, optical position sensing along second principal axis of motion x and along third axis z by the third and second position-measuring device. A schematic view of the bottom side of reflectors 4.1, 4.2 including diffraction gratings 4.1a, 4.1b, 4.2a, 4.2b provided thereon is shown in FIG. 1e. In the present exemplary embodiment, these diffraction gratings 4.1a, 4.1b, 4.2a, 4.2b are arranged as transmitted-light diffraction gratings. The top side of reflectors 4.1, 4.2 is provided with a mirror whose reflective side is oriented in the direction of the transmitted-light diffraction grating. Accordingly, reflectors 4.1, 4.2 are arranged as transmitted-light grating-mirror units in each case. For the desired self-calibration of these components, it may be necessary to connect at least one second optical unit or scanning optics in order to generate self-calibration data from the generated positional signals of the particular primary position-measuring devices and the positional signals of the additional optical units.

In the illustrated exemplary embodiment, it is provided for this purpose, to suitably modify that position-measuring device which is used for the position sensing of object 1 along first principal axis of motion y, or along the first measuring direction, as well as for measuring rotational movements Rx, Rz about second principal axis of motion x and third axis z, i.e., the first position-measuring device. It is, thus, possible to apply the measures described herein to selectively switch the first position-measuring device in terms of the measuring direction recorded therewith, in order to undertake in each case a second positional measurement for calibration purposes using this position-measuring device. Besides the position sensing along first principal axis of motion y, or along the first measuring direction, it is possible to switch the first position-measuring device in a manner that also permits an optional position sensing along other measuring directions, e.g., along second principal axis of motion x and along third axis z.

Figure 2A:
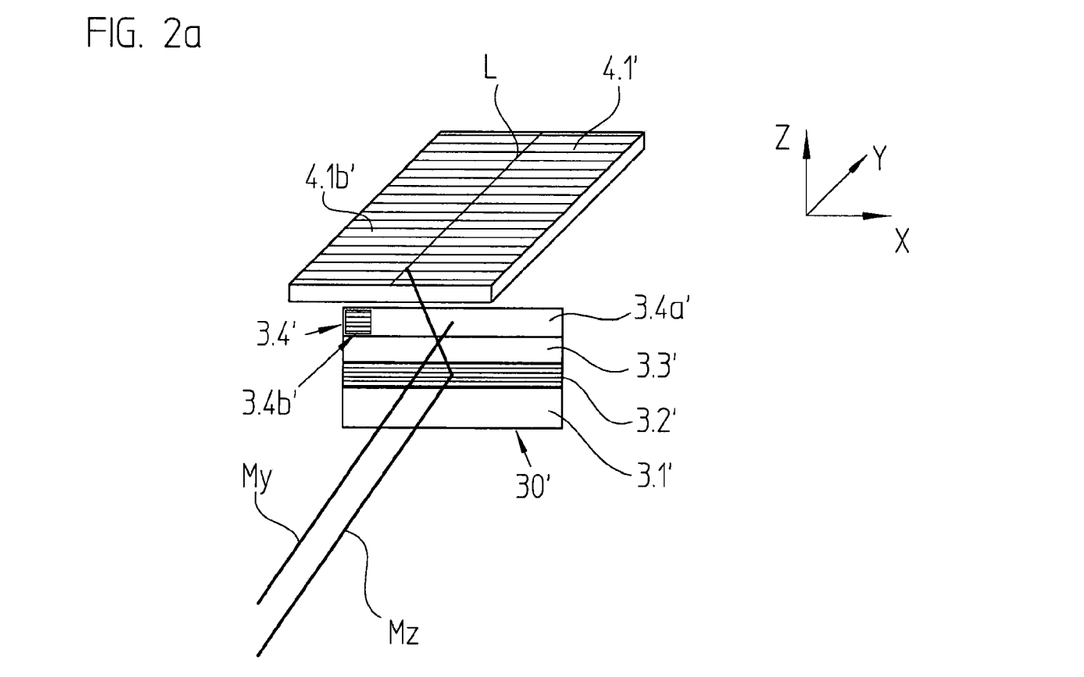
FIGS. 2a and 2b schematically illustrate the system illustrated in FIGS. 1a to 1e in various measuring positions to clarify the switching of the measuring direction using a position-measuring device.
Figure 2B:
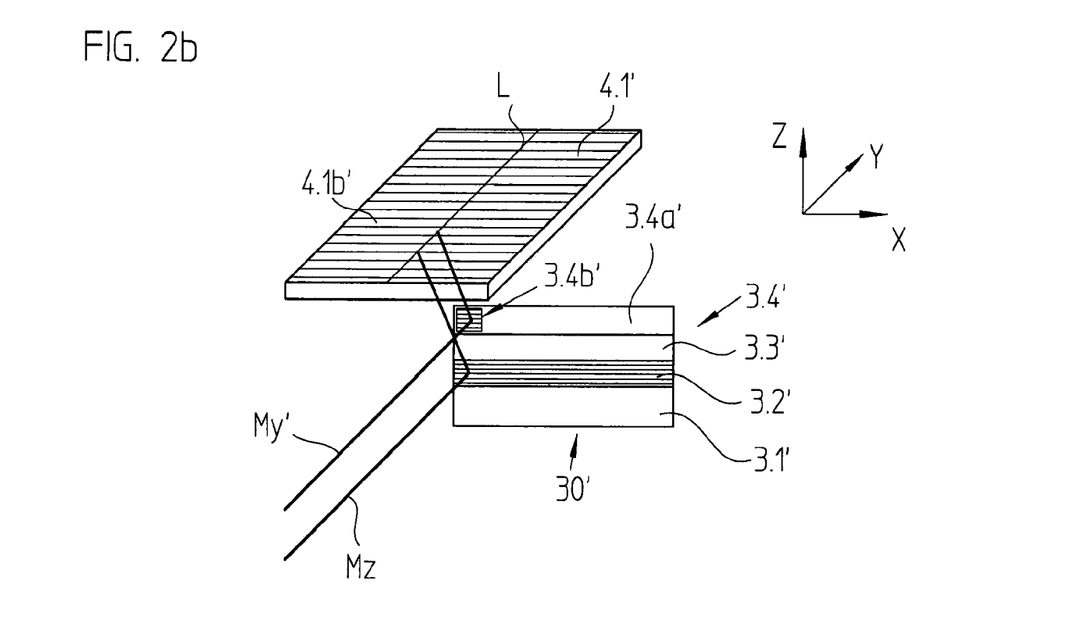

On the basis of the greatly simplified representations in FIGS. 2a and 2b, the following illustrates how a second scanning of reflector 4.1', or of diffraction grating 4.1b' provided thereon may take place along longitudinal extension direction y, or along scanning line L via the suitably modified first position-measuring device, to render possible in this manner a self-calibration of diffraction grating 4.1b'. In the illustrated system for generating positional signals indicative of an object movement along third axis z, diffraction grating 4.1b' of reflector 4.1' is used. German Patent Application No. 10 2012 201 393.3 refers to the position-measuring device used for this purpose as a first position-measuring device.

With regard to the specific scanning beam path, reference is made to German Patent Application No. 10 2012 201 393.3, U.S. patent application Ser. No. 13/757,533, and U.S. Provisional Application Ser. No. 61/593,582. In the present case, the second position-measuring device is concerned.

The present example embodiment provides for a plurality of regions 3.4a', 3.4b', or sections to be variably formed in track 3.4' of measuring standard-reflector unit 30', that is used primarily for position sensing along first principal axis of motion y. A first region 3.4a' is arranged in this case as a measuring reflector in the form of a plane mirror and is used for interferometric position sensing along first principal axis of motion y. Important at this point for the desired measuring-direction switching capability is the formation differing therefrom of at least one second region 3.4b' in this track, e.g., as a measuring standard in the form of an incident-light diffraction grating. In this second region 3.4b', the measuring standard is identical in configuration to the measuring standard which is provided in a further track 3.2' on measuring standard-reflector unit 30' and which is acted upon by measurement beam Mz of the second position-measuring device for the z-axis movement.

This type of formation of regions 3.4a', 3.4b' in track 3.4 makes possible the change-over switching of the measuring directions of the first position-measuring device, as is illustrated in FIGS. 2a and 2b.

In the measuring, or machine position in accordance with FIG. 2a, the object and, thus, measuring standard-reflector unit 30' is located along second principal axis of motion x in a position in which measurement beam My of the first position-measuring device strikes region 3.4a', i.e., measuring reflector provided, for example, as a plane mirror. From there, measurement beam My is reflected in the direction of the optical unit. In this measuring position, the first position-measuring device functions, e.g., in a conventional manner, and is used, for example, for measuring the object position along first principal axis of motion y. In this position, measurement beam Mz of the second position-measuring device likewise shown in FIG. 2a acts upon track 3.2' including the measuring standard provided there, as well as upon the diffraction grating of reflector 4.1'. It is possible to measure the object position along the second measuring direction, or third axis z via the corresponding second position-measuring device.

If the object, or measuring standard-reflector unit 30' moves along second principal axis of motion x into the self-calibration position for third axis z, as is shown in FIG. 2b, measurement beam My of the first position-measuring device then impinges on second region 3.4b' in the corresponding track 3.4'. As illustrated, the measuring standard provided there effects a deflection of measurement beam My' analogously to the deflection of measurement beam Mz of the second position-measuring device in the direction of diffraction grating 4.1b' to be calibrated on reflector 4.1'. In the case of a resulting object movement along first principal direction of movement y, diffraction grating 4.1b' on reflector 4.1' is scanned twice along first principal direction of movement y along scanning line L, i.e., along first principal axis of motion y, or along the first measuring direction. Thus, a self-calibration of diffraction grating 4.1b' on reflector 4.1' is possible, without an additional optical or scanning unit being required therefor. The first position-measuring device, which is actually used primarily for the position sensing along the first measuring direction, or along first principal axis of motion y, may be switched in this position such that a position sensing along another measuring direction, namely along third axis z is possible. Considered together with the available positional signals of the second position-measuring device provided for this axis z, a self-calibration of reflectors 4.1' is possible along the longitudinal extension direction thereof, which corresponds to first principal axis of motion y. During the traverse movement along first principal axis of motion y, the generated positional signals of the first and second position-measuring devices are fed to a suitable calibration unit.

Based on this principle, in addition to diffraction gratings 4.1b, 4.2b, diffraction gratings 4.1a, 4.2a on reflectors 4.1, 4.2 of the system illustrated in FIGS. 1a to 1e may also undergo a self-calibration along first principal axis of motion y. In the third position-measuring device of the present system, diffraction gratings 4.1a, 4.2a are provided, which are used for a position sensing of object 1 along second principal axis of motion x. With regard to the scanning beam path of this position-measuring device, reference is again to German Patent Application No. 10 2012 201 393.3, in which this position-measuring device is referred to as a second position-measuring device. To switch the first position-measuring device to measure the object movement along first principal axis of motion y into this measuring direction as well, measuring standard-reflector unit 3 includes a further track 3.1 having differently formed regions 3.1a, 3.1b, as illustrated in FIG. 1d. While region 3.1a is arranged as a measuring reflector for the position sensing of the first position-measuring device along first principal axis of motion y, regions 3.1b are provided with a measuring standard in order, in these positions, to effect in each case a deflection of the measurement beam incident thereto in the direction of diffraction gratings 4.1a, 4.2a on reflectors 4.1, 4.2, and thereby render possible a second scanning of the same when an object movement along first principal axis of motion y takes place in this position. In this case, the positional signals of the switched first position-measuring device and of the third position-measuring device are fed to a calibration unit.

Thus, the measures described herein make possible a self-calibration of specific components in the described system, without additional expenditures being required on the part of the optical or scanning unit 2 of the positional-measuring devices used. This is possible by the selective switching of the measuring direction in one of the position-measuring directions used in the present case of the first position-measuring device. This may be used, therefore, in certain machine positions or calibration positions for the second optical scanning of the corresponding components required for self-calibration and for generating corresponding positional signals.

As mentioned above, the first position-measuring device as described herein is configured, as illustrated, as a four-axis interferometer. It is thereby ensured that, for instance, even during the ensuing self-calibration of the reflectors along first principal axis of motion y, for example, via a measurement beam $My_1$ deflected correspondingly, a determination of the position and orientation of the object is possible via the three other measurement beams $My_2$, $My_3$ and $My_4$.

The desired measuring direction, along which a scanning, or position sensing is to take place, is adjusted in accordance with the system described herein exclusively by an appropriate modification on the part of measuring standard-reflector unit 3. A plan view is shown in FIG. 1d. No changes are needed on the part of optical unit 2 of the first position-measuring device. In regions 3.4a, 3.4b, or 3.1a, 3.1b, differently configured as described herein, in tracks 3.1, 3.4 of the measuring standard-reflector unit 3, the beams of the corresponding measurement beams incident thereto of the corresponding measurement beams undergo different deflection effects. It is considered to be advantageous if a first region 3.1a, 3.4a, which is used for generating the primary positional signals of the particular position-measuring device, extends over a substantial portion of track 3.1, 3.4, and if the second, differently configured region 3.1*b*, 3.4*b*, which is used for generating positional signals in the switched operation, extends merely over a significantly smaller region of track 3.1, 3.4. Thus, as in the above exemplary embodiment, it may be provided for first region 3,1*a*, 3.4*a* to be centrally located in track 3.1, 3.4, and for a differently configured second region 3,1*b*, 3.4*b* to be provided merely at at least one end, as this is shown in the illustrated exemplary embodiment of measuring standard-reflector unit 3 in FIG. 1*d*.

Based on the measures described herein, this type of switching of measuring direction may also be used in other application cases independently of the discussed self-calibration.

For example, it may be provided for an individual measuring direction to be measured very accurately or, however, at a reduced Abbe distance at a specific position of a stage, for example, to scan a reference mark. By switching a redundant measuring axis from some other measuring direction used in another operation to the measuring direction to be recorded very accurately, the positions along this measuring axis are able to be redundantly and thus more accurately measured.

What is claimed is:

1. A position-measuring device for measuring a position of a first object relative to a second object, the first object and the second object being movable relative to one another along at least two measuring directions, comprising:
    an optical unit attachable to one of the objects and including at least one light source, a detector system, and further optical elements in a defined configuration; and
    a measuring standard-reflector unit attachable to the other object and including at least two differently formed regions in one track that are optically scannable by the optical unit for position sensing;
    wherein the different formation of the regions provide for switching among the measuring directions during position sensing; and
    wherein the optical unit is adapted to generate positional signals in accordance with relative movement of the two objects for each measuring direction.

2. The position-measuring device according to claim 1, wherein measuring reflectors and measuring standards are provided in the regions of the track of the measuring standard-reflector unit.

3. The position-measuring device according to claim 2, wherein the measuring reflectors include plane mirrors, and the measuring standards include incident-light diffraction gratings.

4. The position-measuring device according to claim 2, wherein the differently formed regions are adapted to subject ray bundles, that strike the differently formed regions, to different deflection effects.

5. The position-measuring device according to claim 1, wherein the measuring standard-reflector unit includes a plurality of parallel tracks, in which measuring standards and/or measuring reflectors are provided.

6. The position-measuring device according to claim 5, wherein a first measuring standard is arranged in a first track, a measuring reflector is arranged in a second track, and a second measuring standard is arranged in a second region, the first measuring standard being identical to the second measuring standard.

7. The position-measuring device according to claim 1, wherein a central first region is arranged in the track along a longitudinal direction of the track, and a differently configured second region is arranged in the track at least at one end of the first region.

8. The position-measuring device according to claim 1, wherein a first region is arranged in the track and a second region is arranged in the track, the first region extend over a greater part of the track than the second region.

9. A system, comprising:
    a first object movable along two orthogonal, first and second principal axes of motion and along a third axis, the first principal axis of motion corresponding to a first measuring direction, the third axis corresponding to a second measuring direction, and the second principal axis of motion corresponding to a third measuring direction;
    a stationary second object; and
    a first position-measuring device adapted to measure a position of the first object relative to the second object, the position-measuring device including:
        an optical unit attached to the second object and including at least one light source, a detector system, and further optical elements in a defined configuration; and
        a measuring standard-reflector unit attached to the first object and including at least two differently formed regions in one track that are optically scannable by the optical unit for position sensing;
    wherein the different formation of the regions provide for switching among the measuring directions during position sensing;
    wherein the optical unit is adapted to generate positional signals in accordance with relative movement of the two objects for each measuring direction; and
    wherein the measuring standard-reflector unit extends along the second principal axis of motion and includes a track having a first region including a measuring reflector and a second region having a measuring standard, so that, in accordance with optical scanning of the first region, positional signals indicative of movement along the first measuring direction of the first object are generated, and, upon optical scanning of the second region, further positional signals indicative of movement of the first object along the second measuring direction or along the third measuring direction are generated.

10. The system according to claim 9, further comprising a second position-measuring device adapted to generate positional signals indicative of movement of the first object along the second measuring direction.

11. The system according to claim 9, further comprising a third position-measuring device adapted to generate positional signals indicative of movement of the first object along the third measuring direction.

12. The system according to claim 10, wherein, upon optical scanning of the measuring standard in the second region and simultaneous generation of positional signals by the second position-measuring device during a traverse movement along the first measuring direction, a reflector of the second position-measuring device scanned twice along the first measuring direction.

13. The system according to claim 11, wherein, upon optical scanning of the measuring standard in the second region and simultaneous generation of positional signals by the third position-measuring device during a traverse movement along the first measuring direction, a reflector of the third position-measuring device scanned twice along the first measuring direction.

14. The system according to claim 12, wherein the positional signals of the first and second position-measuring devices are transmittable to a calibration unit.

15. The system according to claim 13, wherein the positional signals of the first and third position-measuring devices are transmissible to a calibration unit.

16. The system according to claim 9, wherein the first position-measuring device is arranged as a multi-axis interferometer having four measurement beams.

* * * * *